(12) United States Patent
Stevenson et al.

(10) Patent No.: US 6,815,005 B2
(45) Date of Patent: Nov. 9, 2004

(54) METHOD AND COMPOSITION TO ENHANCE POLYOLEFIN SURFACES

(75) Inventors: Michael J. Stevenson, 1200 Soldier Pass Rd., Sedona, AZ (US) 86336; Robert A. Reeves, Cottonwood, AZ (US); Matthew P. Stevenson, Sedona, AZ (US)

(73) Assignee: Michael J. Stevenson, Sedona, AZ (US)

(*) Notice: Subject to any disclaimer, the term of this patent is extended or adjusted under 35 U.S.C. 154(b) by 0 days.

(21) Appl. No.: 08/914,536

(22) Filed: Aug. 19, 1997

(65) Prior Publication Data

US 2001/0051222 A1 Dec. 13, 2001

Related U.S. Application Data

(63) Continuation-in-part of application No. 08/566,906, filed on Dec. 4, 1995, now Pat. No. 5,746,961.

(51) Int. Cl.$^7$ .................................................. B05D 3/02
(52) U.S. Cl. ..................................... 427/180; 427/393.5
(58) Field of Search .............................. 427/180, 393.5, 427/412.3, 421

(56) References Cited

U.S. PATENT DOCUMENTS 3,432,339 A * 3/1969 Howell et al.
4,252,762 A * 2/1981 Stevenson .................... 264/126

FOREIGN PATENT DOCUMENTS

| JP | 01-133777 | * | 5/1989 |
| WO | 96/23041 | * | 8/1996 |
| WO | WO 00/50243 | * | 8/2000 |

* cited by examiner

*Primary Examiner*—Erma Cameron
(74) *Attorney, Agent, or Firm*—Robert E. Strauss (57) ABSTRACT

There is disclosed a method for permanently and decoratively enhancing a polyethylene surface of a preformed article. In this method, a decorative enhancement composition is created by blending particulate thermoplastic powder, a binder solid, and a colorant into a liquid carrier. The particulate thermoplastic powder bonds to the colorant, the binder solid promotes adhesion of the colored thermoplastic to the polyethylene surface until it can be bonded, and the liquid carrier facilitates the transfer of the colored thermoplastic to the polyethylene surface of the preformed article. The decorative enhancement composition is applied to the polyethylene surface. The deposited decorative enhancement composition and the interfacing polyethylene surface are heated sufficiently to incorporate the decorative enhancement composition into the polyethylene surface. The enhanced polyethylene surface is allowed to cure by removal of the application of heat. Upon curing, the decorative enhancement composition is permanently incorporated into the polyethylene surface enhancing the physical properties and the appearance of the preformed article.

This invention also comprises a decorative enhancement composition for the permanent decorative enhancement of polyethylene surfaces of preformed articles consisting essentially of a dry weight ratio of 30 to 70 percent binder solid to 70 to 30 percent particulate thermoplastic powder combined with colorant, wherein colorant comprises 9 to 50 percent of the total dry weight of the binder, powder, and pigment, mixed with liquid carrier, wherein the liquid carrier comprises 20 to 90 weight percent of the overall decorative enhancement composition.

9 Claims, 8 Drawing Sheets

METHOD AND COMPOSITION TO ENHANCE POLYOLEFIN SURFACES

This application is a continuation-in-part of application Ser. No. 08/566,906, filed on Dec. 4, 1995, and issued on May 5, 1998 as U.S. Pat. No. 5,746,961.

BACKGROUND OF THE INVENTION

1. Field of Invention

This invention relates to a method for permanently and decoratively enhancing surfaces of preformed polyethylene articles, and to a decorative enhancement composition useful in the method.

2. Brief Statement of the Prior Art

Available prior art reveals methods practiced during molding of polyethylene articles to enhance their surfaces by precoating of the mold, or by using multiple molding steps. U.S. Pat. Nos. 4,252,762 and 4,519,972 disclose methods for imparting a decorative pattern to the inside of a mold cavity which transfers to the product during the molding process. Similarly, U.S. Pat. No. 4,548,779 discloses a two-stage rotational molding process to form a product with inner and outer layers. U.S. Pat. No. 4,681,712 discloses electrostatically coating the inner surface of a mold which is subsequently charged with thermoplastic material to form a molded thermoplastic product to which the coating transfers during molding. The aforementioned processes unavoidably increase the molding cycle time, particularly when two or more molding steps are required.

A distinct disadvantage of articles formed of polyolefins, particularly of polyethylene, is their low receptivity to coatings, paints, inks, and the like. Some attempts have been made to chemically or physically treat the surfaces of polyethylene articles before applying a color coating. An example is the flame treatment of polyethylene surfaces to render them receptive to printing inks. These procedures are costly and do not result in a molded product in which the pigments or dyes of the coatings are incorporated into the molded skin of the polyethylene article, thus permitting the coating to become obliterated with wear.

OBJECTIVES OF THE INVENTION

It is an objective of the invention to provide a method for permanently decorating the surface of a preformed articles of polyolefin, particularly of polyethylene.

It is a further objective of the invention to provide a decorative enhancement composition for permanently decorating a surface of a preformed polyolefin article, particularly a polyethylene article.

It is likewise an objective of the invention to provide a method for protecting the decorative enhanced surface by incorporating a protective coating into the surface with the decorative coating.

BRIEF DESCRIPTION OF THE INVENTION

The surfaces of preformed polyolefin articles, particularly polyethylene articles, are permanently colored with a decorative enhancement composition which comprises a mixture of a colorant with a particulate thermoplastic, such as polyethylene. The decorative enhancement composition is applied to the article to coat the polyolefin surface and the coated surface is heated to fuse the coating into the surface of the preformed polyolefin. The method is facilitated by incorporating a binder in the decorative enhancement composition which temporarily binds the colorant and thermoplastic to the surface of the polyolefin. The mixture of thermoplastic, colorant and binder is dispersed in a liquid carrier and blended to a uniform consistency suitable for application by spraying, dipping, brushing, etc. Multiple enhancement effects can be accomplished by applying multiple coatings of decorative enhancement compositions. A clear overcoat composition comprised of particulate thermoplastic, binder solid, and liquid carrier can also be applied to the enhanced areas of the article to enhance the permanent retention of the colorant.

BRIEF DESCRIPTION OF THE DRAWINGS

The invention will be described in the figures of which.

DETAILED DESCRIPTION OF THE INVENTION

This invention comprises both a decorative enhancement composition and a method to incorporate the decorative enhancement composition into the surface of a preformed polyolefin article. The invention is particularly useful and preferred for practice on the highly repellant surfaces of polyethylene, including low, medium, high and ultrahigh density polyethylene. The invention, however, is equally applicable to decorative enhancement of preformed articles of other polymers such as polyproplyene and copolymers such as ethylene-propylene and ethylene-vinyl acetate copolymers, and blends of polyethylene with other polymers such as polyolefin rubbers, e.g., ethyl-propylene based copolymers.

The method is practiced by applying a decorative enhancement composition to at least one polyolefin surface of a preformed article. The decorative enhancement composition comprises a coating component, an adhesive binder, a colorant, and a liquid carrier.

The coating component is a thermoplastic powder in particulate form which bonds with the colorant. The adhesive binder promotes adhesion of the colorant and thermoplastic to the polyolefin surface until the decorative enhancement composition can be incorporated into the polyolefin surface of the preformed article. The liquid carrier facilitates the application of the composition to the article surface by conventional methods such as spraying, rolling, brushing, dipping, etc.

The thermoplastic powder useful in the invention has a density from 0.88 to 0.97 grams/cubic centimeter and can be one, or a mixture, of the following thermoplastics: low, medium, high and ultra high density polyethylene, polypropylene, and ethylene-propylene and ethylene-vinyl acetate copolymers. Preferably the thermoplastic powder is at least 50 weight percent polyethylene. The size of the particulates of thermoplastic powder are from 5 to 140 microns in diameter, preferably, from 5 microns to 40 microns in diameter.

The adhesive binder is a solid at ambient temperatures and is included in the enhancement composition at a concentration to provide a ratio of the adhesive binder to the particulate thermoplastic powder from 30 to 70 weight percent adhesive binder to from 70 to 30 weight percent particulate thermoplastic powder (dry weight basis).

The adhesive binder solid can be an aromatic or aliphatic hydrocarbon resin, petroleum wax, synthetic wax, oxidized synthetic wax or emulsifiable wax, rosin, rosin-ester, terpene-based resin, or chlorinated polyolefin resin.

The colorant can be pigment-based, dye-based, or a combination of both. The preferred colorants are pigments as they are more durable than dyes. Pigments can be either organic or inorganic in classification. Colorants which are useful include those containing inorganic pigments such as titanium dioxides (rutile, anatase), zinc oxide, iron oxides in hues such as yellow, buff, tan, brown, salmon and black, iron chromates and molybdates for colors from light yellow to red orange, lead chromates, lead sulfate, lead molybdate, chrome yellows and oranges, cadmium pigments in a variety of yellows, oranges, reds and maroons as pure cadmium colors or with barium sulfide (lithopones), cadmium mercury mixtures, cadmium sulfide or cadmium sulfoselenides, nickel and titanium dioxide mixtures, sodium, potassium or ammonium coordination compounds of ferri-ferrocyanide, ultramarine blues (a calcined mixture of china clay, sodium carbonate, silica, sulfur and reducing agents), cobalt aluminate (cobalt blues), chromium oxide, metal flake pigments such as aluminum, zinc, copper, bronze powders, metal silver pigments, pearlescent and iridescent flakes of basic lead carbonates, bismuth oxychlorides and titanium coated mica, etc. Various organic pigments which are useful include azo pigments, such as benzimidazolone pigments, pyrazolone pigments, copper phthalocyanine, quinacridones, anthraquinones, condensation pigments, tetra-chloro-isoindolinones, carbon blacks, etc.

When pigments are used, the colorant can comprise from 9 to 50 weight percent of the dry weight of the thermoplastic and binder. When dyes are used, the colorant can comprise from 9 to about 70 weight percent of the dry weight of the thermoplastic and binder.

A liquid carrier is included in the enhancement composition to provide the desirable and necessary consistency and viscosity for application of the composition to the surface of the article. Suitable liquid carriers include suitable inert organic solvents such as toluene, xylene, acetone, methyl-ethyl ketone, naphtha, mineral oil spirits, methylene chloride, isopropanol, etc., or water with from 1 to about 5 weight percent of an ionic or non-ionic surfactant, sufficient to form a stable aqueous suspension of the particulate solids.

Examples of suitable non-ionic surfactants are ethylene oxide condensates of vegetable oils, alcohols, phenols, organic acids and hydroxy esters. Included in such compounds are castor oil, tall oil and linseed oil condensates of ethylene oxide having 5 to 70 weight percent of oxyethylene units. Other non-ionic surfactants include polyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide and N-lauryl-N-polyoxyethylene ethyl amine and the like; and polyoxyethylene thioethers such as polyoxyethylene n-dodecyl thioether.

Ionic surfactants which can be employed herein include anionic compounds obtained by sulfonation of fatty derivatives such as sulfonated tallow, sulfonated vegetable oils and sulfonated marine animal oils. Various sulfonated and sulfated fatty acid esters of mono- and polyvalent alcohols are also suitable such as a sulfated butyl ester of a fatty ester, sulfated fatty esters, etc.

The amount of liquid carrier in the enhancement composition will be determined to some extent by the application method. For application by spray, the liquid carrier should be adjusted to comprise from 60 percent to 90 percent of the decorative enhancement composition. Other application techniques such as rolling, brushing, sponging, or dipping require as little as 20 weight percent liquid carrier in the decorative enhancement composition. For brushing and rolling application techniques, the decorative enhancement composition can be thickened with a rheological additive such as fumed silica in an amount from 1 to 5 weight percent. The decorative enhancement composition is prepared by dissolving or dispersing the adhesive binder in the liquid carrier. The particulate thermoplastic powder is then added to the binder/carrier mixture followed by the addition of the colorant. The resultant mixture is blended sufficiently to achieve uniform dispersion and consistency of the final decorative enhancement composition by high speed dispersers or mills. Thereafter, the proportion of liquid carrier in the decorative enhancement composition can be adjusted to obtain the desirable flow properties (viscosity) for application to the preselected area of the polyolefin surface to provide a uniform coating.

Figure 1:
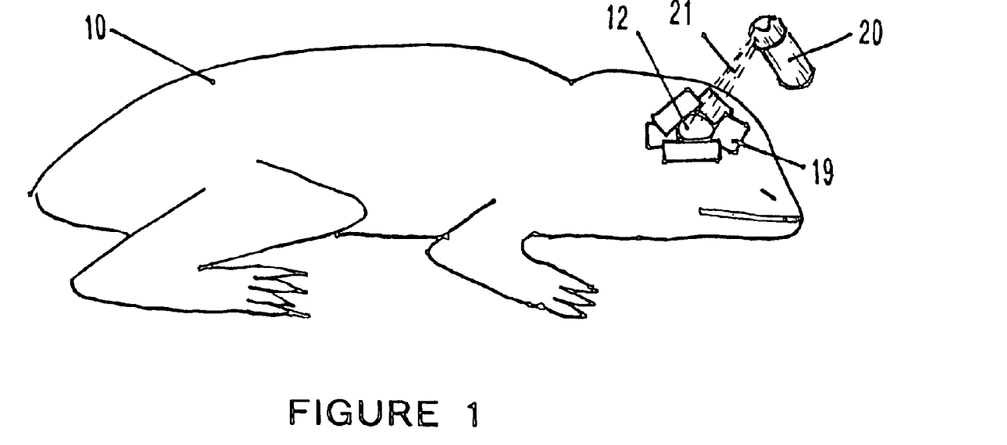
FIG. 1 illustrates application of the decorative enhancement composition to a surface of a preformed polyethylene article.

FIG. 1 illustrates the application by spray 21 from an aerosol can 20 of a coating 12 of the decorative enhancement composition onto a preselected area of a polyethylene surface of a preformed article 10. The decorative enhancement composition is particularly useful to impart a colorant different than that of the article to enhance the appearance of the article. In this figure, the article is a green-colored, rotationally-molded, polyethylene frog which weighs about 25 pounds. The frog is approximately two feet high and uniformly green prior to any application of the decorative enhancement composition. The decorative enhancement composition in this application has a yellow colorant and is applied to the eye area of the frog to enhance the frog's appearance by distinguishing the eye of the frog. Masking tape 19 is applied to prevent spray from being deposited onto surfaces not intended for coating with the enhancement composition.

Figure 2:
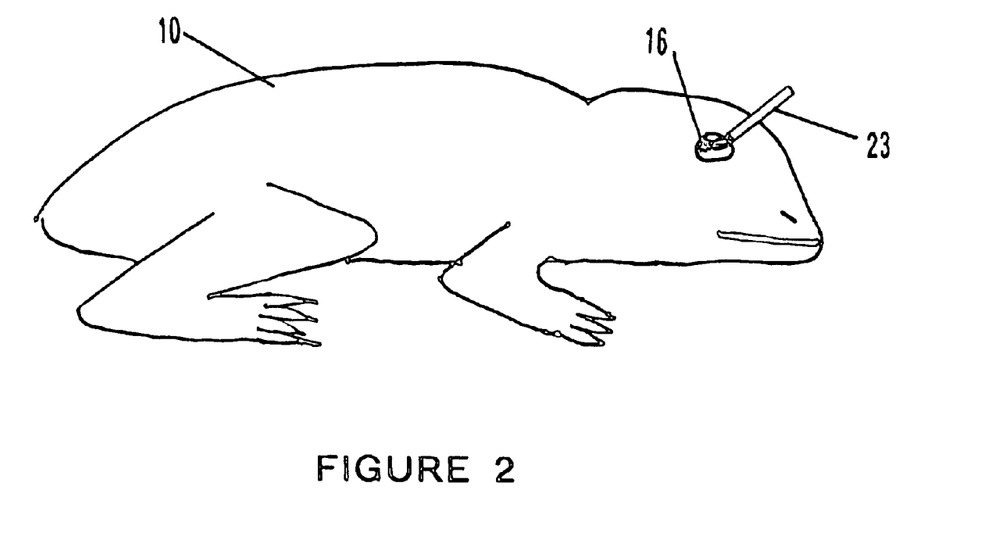
FIG. 2 illustrates brushing a second decorative enhancement composition onto the decorative enhancement coating on the article.

FIG. 2 illustrates application by a brush 23 of a coating 16 of a second, different decorative enhancement composition over the previously deposited coating 12. In this figure, the brushed-on decorative enhancement composition has a black colorant and is applied to represent the pupil of the frog's eye.

Figure 3:
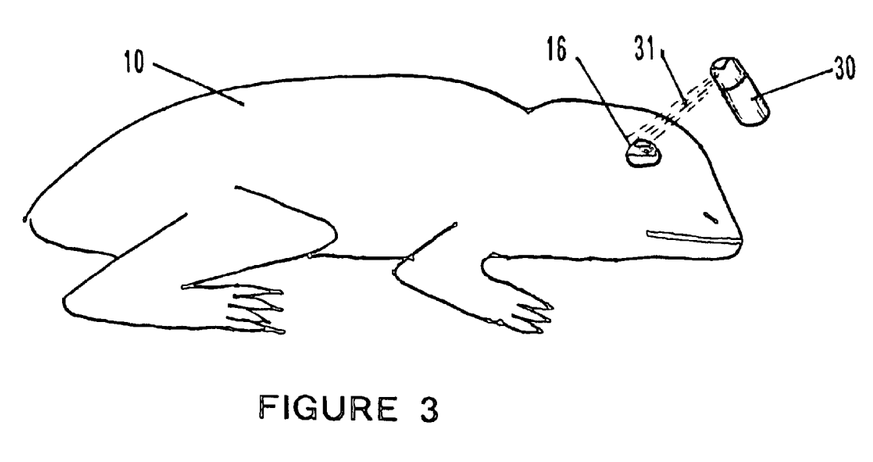
FIG. 3 illustrates spraying a clear overcoat onto the decorative enhancement coatings.

FIG. 3 depicts application by spray 31 of a coating of a clear (uncolored) overcoat composition contained in aerosol can 30. The clear overcoat composition is applied over the coatings 12 and 16 of the previously deposited decorative enhancement compositions. The clear overcoat composition is applied to preserve and enhance the appearance of the article.

The clear overcoat composition is a mixture of a protective component and a liquid carrier, or can be a lacquer, polymer, or an emulsion. Preferably, the protective component is a mixture of a particulate thermoplastic powder and an adhesive binder solid which are substantially similar to the thermoplastic powder and adhesive binder used in the decorative enhancement composition. However, the protective component can contain slightly more particulate thermoplastic powder and slightly less binder solid than the decorative enhancement composition, with the ratio of the binder solid to the particulate thermoplastic powder being from 30 to 70 weight percent adhesive binder to from 70 to 30 weight percent particulate thermoplastic powder (dry weight basis).

The thermoplastic powder used is of the same size range as used in the decorative enhancement composition, i.e., from 5 to 140 microns in diameter, preferably from 5 microns to 40 microns in diameter. It is one, or a mixture, of the following thermoplastics: polyethylene, polypropylene and/or polyethylene-propylene or ethylene-vinyl acetate copolymers.

The adhesive binder solid promotes adhesion of the overcoat composition to the polyethylene surface and previously deposited coatings of decorative enhancement compositions until the coatings can be incorporated (fused) into the polyolefin surface of the article. Any of the aforementioned adhesive binders can be used as the adhesive binder in the overcoat composition.

The thermoplastic and adhesive binder solids are dissolved or dispersed in a liquid carrier which facilitates the coating of the thermoplastic onto the surface of the preformed article. Any of the aforementioned solvents can be used as the liquid carrier in the overcoat composition.

The overcoat composition can be thinned by liquid carrier to the proper consistency for application to the preformed article in the same manner as described for thinning of the decorative enhancement composition and can be similarity thickened with a rheological additive such as fumed silica.

The clear overcoat composition is prepared following the same preparation method as described for the decorative enhancement composition, omitting, however, addition of the colorant.

Figure 4:
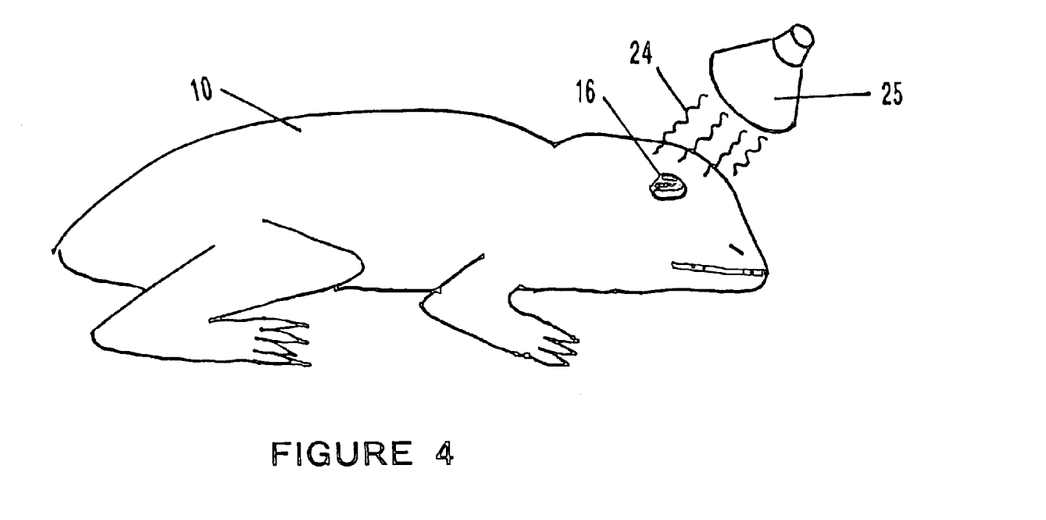
FIG. 4 illustrates application of heat to fuse the deposited clear overcoat and decorative enhancement coatings into the polyethylene surface of the preformed article.

FIG. 4 illustrates heat 24 being applied by heat lamp 25 to the coating of the clear overcoat composition, the coatings 12 and 16 of decorative enhancement composition 16 and the underlying polyethylene substrate. The coatings of the clear overcoat composition and decorative enhancement composition and the underlying polyolefin surface are heated to a temperature above about 250 degrees Fahrenheit and for sufficient time to incorporate the coatings into the polyolefin surface. The length of time of heating depends significantly on variables such as the type of heating, e.g., an open flame or a heat gun, the area of the coatings and wall thickness of the article. The time can be only a few seconds when using an open flame while up to one or two minutes when using a heat gun. Care must be taken not to overheat the surface of the article such that warpage of the article occurs. The heat source can be applied in several ways such as by passing an open flame over the coated area, passing a heating element over the coated area, and/or blowing hot air over the coated area are acceptable methods.

Once heated, the coatings of the clear overcoat and decorative enhancement compositions become incorporated into the surface of the polyolefin, presumably by fusion at the interface of the coatings and the polyolefin surface. The heat is then removed to allow article to cool, forming a permanent bond between the coatings and the polyolefin surface.

Figure 5:
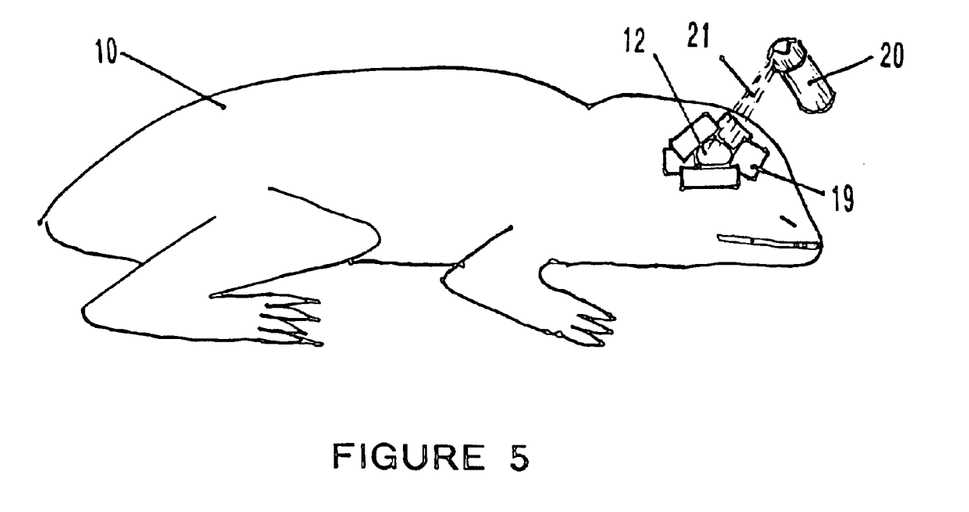
FIG. 5 illustrates spraying a decorative enhancement composition to coat a polyethylene surface of a preformed article.

FIG. 5 illustrates the method of applying a decorative enhancement composition to a polyethylene surface of a preformed article, the same as described with regard to FIG. 1.

Figure 6:
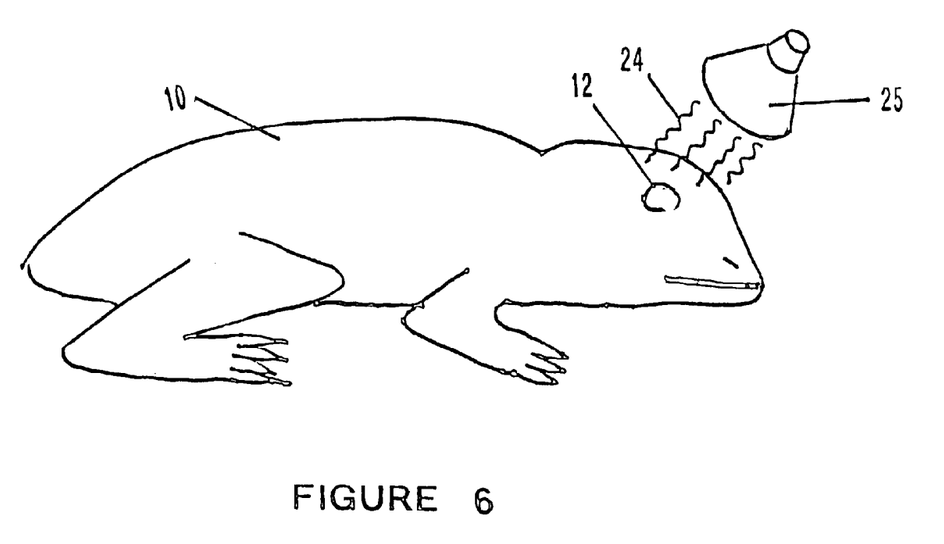
FIG. 6 illustrates application of heat to fuse the coating of the decorative enhancement composition into the polyethylene surface.

FIG. 6 illustrates the application of heat to the coating 12 of the decorative enhancement composition prepared as shown in FIG. 5. The heat treatment is the same as that described with regard to FIG. 4.

Figure 7:
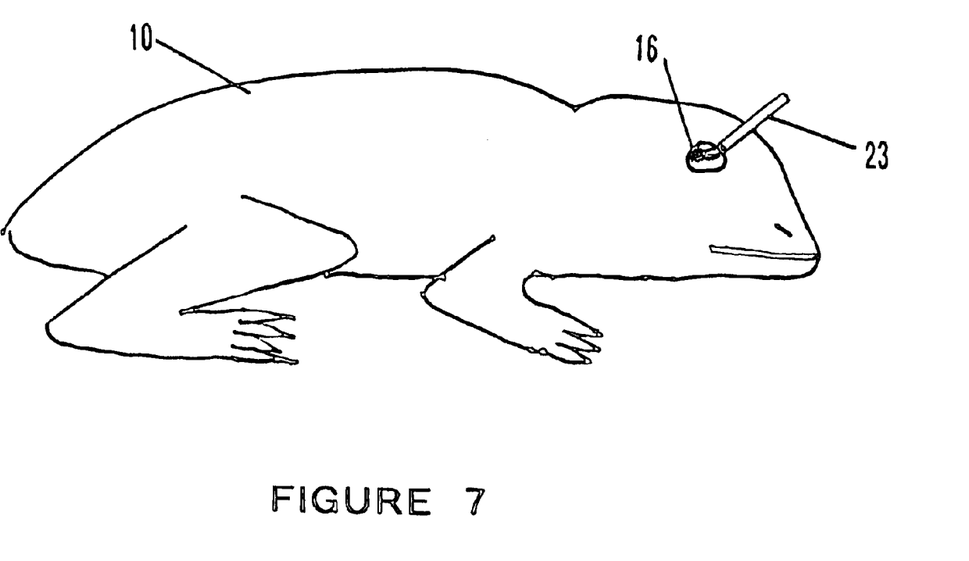
FIG. 7 illustrates brushing a second decorative enhancement composition over the surface of heat fused coating of a previously deposited decorative enhancement composition.

FIG. 7 illustrates application by brush 23 of a different decorative enhancement composition over heat treated coating 16 of the previously deposited decorative enhancement composition, the same as described with regard to FIG. 2.

Figure 8:
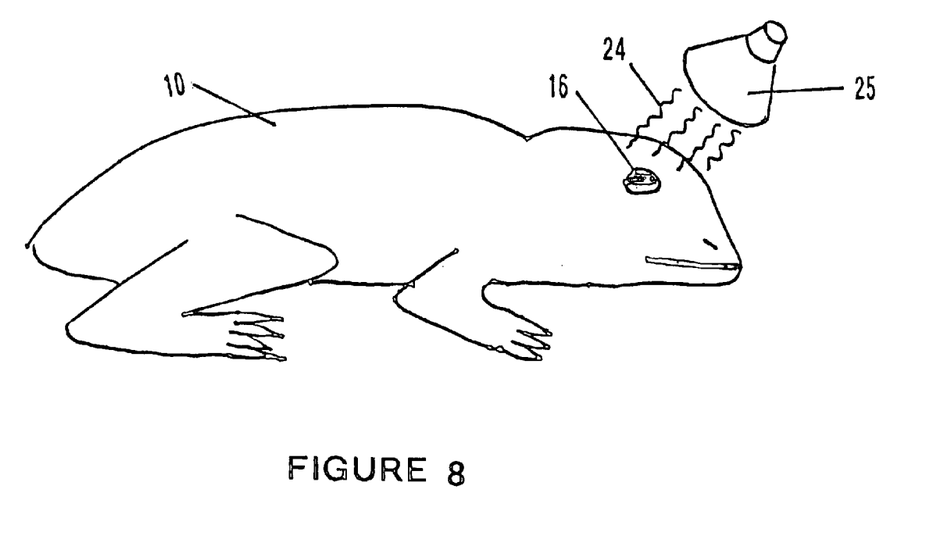
FIG. 8 illustrates application of heat to fuse the coating of the decorative enhancement composition into the polyethylene surface of the preformed article.

FIG. 8 illustrates heat 24 being applied by heat lamp 25 to the black and yellow deposited decorative enhancement compositions 16 and 12 together and the underlying polyethylene substrate. The heat treatment is the same as that described with regard to FIG. 4.

The invention has been described with reference to the illustrated and presently preferred embodiment. It is not intended that the invention be unduly limited by this disclosure of the preferred embodiment. Instead, it is intended that the invention be defined by the means, and their obvious equivalents, set forth in the following claims.

What is claimed is:

1. A method for decorative enhancement of a polyethylene surface of a molded polyethylene article, which method comprises the steps of:
   (a) combining a decorative enhancement composition and said polyethylene surface wherein said decorative enhancement composition consists essentially of:
      (1) an inert organic solvent that provides the decorative enhancement composition with a consistency and viscosity for liquid methods of application;
      (2) a colorant to impart a surface color;
      (3) a binder solid selected from the class consisting of aromatic and aliphatic hydrocarbon resins, waxes, rosins, and terpene-based resins; and
      (4) polyethylene powder; and
   (b) heating said decorative enhancement composition and said polyethylene surface to incorporate said decorative enhancement composition into said polyethylene surface and produce a molded polyethylene article having said surface decoratively enhanced by said colorant.

2. The method of claim 1 wherein said molded polyethylene article is a preformed, rotationally molded polyethylene article.

3. The method of claim 2 wherein said combining step is accomplished by applying said decorative enhancement composition to said preformed rotationally molded polyethylene article.

4. The method of claim 3 wherein said heating step is accomplished by heating said decorative enhancement composition and said surface of the preformed rotationally molded polyethylene article to fuse said decorative enhancement composition into said surface.

5. The method of claim 1 wherein said liquid carrier comprises 20 to 90 weight percent of said decorative enhancement composition.

6. The method of claim 1 wherein said colorant, said binder solid and said polyethylene powder collectively comprise 10 to 80 weight percent of said decorative enhancement composition.

7. The method of claim 6 wherein said colorant comprises 9 to 50 weight percent of colorant, binder solid and polyethylene, and said binder and said polyethylene powder collectively comprises 50 to 91 weight percent of colorant, binder solid and polyethylene.

8. The method of claim 7 wherein said polyethylene powder has a density from 0.88 to 0.97 grams/cubic centimeter and a particle size no greater than 140 microns.

9. A method for decorative enhancement of a polyethylene surface of a molded polyethylene article, which method comprises the steps of:

(a) combining a decorative enhancement composition and said polyethylene surface wherein said decorative enhancement composition consists essentially of:

(1) an inert organic solvent that provides the decorative enhancement composition with a consistency and viscosity for liquid methods of application;

(2) a colorant to impart a surface color;

(3) a binder solid selected from the class consisting of aromatic and aliphatic hydrocarbon resins, waxes, rosins, and terpene-based resins; and (4) polyethylene powder; and (b) heating said decorative enhancement composition and said polyethylene surface to fuse said decorative enhancement composition into said polyethylene surface and produce a molded polyethylene article having said surface decoratively enhanced by said colorant.

* * * * *